US 6,688,631 B1

(12) United States Patent  (10) Patent No.: US 6,688,631 B1
Andre  (45) Date of Patent: Feb. 10, 2004

(54) DEVICE FOR DAMPING THE YAWING MOTIONS OF A HIGHWAY TRAILER DRAWN BY A MOTOR VEHICLE

(75) Inventor: Jean-Luc Andre, Obernai (FR)

(73) Assignee: Lohr Industrie, Bangenbieten (FR)

( * ) Notice: Subject to any disclaimer, the term of this patent is extended or adjusted under 35 U.S.C. 154(b) by 86 days.

(21) Appl. No.: 10/048,092
(22) PCT Filed: Jul. 26, 2000
(86) PCT No.: PCT/FR00/02152
§ 371 (c)(1),
(2), (4) Date: Feb. 7, 2002
(87) PCT Pub. No.: WO01/07273
PCT Pub. Date: Feb. 1, 2001

(30) Foreign Application Priority Data

Jul. 27, 1999 (FR) .......................... 99 09829

(51) Int. Cl.⁷ ........................ B62D 53/06; B60D 1/32
(52) U.S. Cl. .................... 280/455.1; 280/432
(58) Field of Search .............. 280/455.1, 432

(56) References Cited

U.S. PATENT DOCUMENTS

| 2,091,668 A | * 8/1937 | Bradford ............... 280/455.1 |
| 3,393,923 A | * 7/1968 | Rendessy ............... 280/455.1 |
| 3,749,420 A | 7/1973 | Johnson et al. ........ 280/432 |
| 4,003,586 A | * 1/1977 | Luck .................... 280/455.1 |
| 5,725,231 A | * 3/1998 | Buie ..................... 280/455.1 |
| 6,494,476 B2 | * 12/2002 | Masters et al. ........ 280/455.1 |

FOREIGN PATENT DOCUMENTS

| CH | 675858 A2 | 11/1990 | ............ B60D/1/06 |
| DE | 25 27 673 | 12/1976 | ............ B60D/1/00 |
| DE | 77 18 934 | 9/1977 | ............ B60D/1/00 |
| DE | 37 41 820 A1 | 6/1989 | ............ B60K/28/08 |
| DE | 40 03 316 A1 | 8/1991 | ............ B60T/8/18 |
| DE | 44 41 307 A1 | 6/1995 | ............ B62D/53/04 |
| FR | 2.044.031 | 2/1971 | ............ B60D/1/00 |
| WO | WO 89/02374 | * 3/1989 | ............ 280/455.1 |

* cited by examiner

Primary Examiner—Lesley D. Morris
Assistant Examiner—Matthew Luby
(74) Attorney, Agent, or Firm—Davis & Bujold, PLLC (57) ABSTRACT

The device for damping yawing motions between a highway motor vehicle and its trailer is composed of a curvilinear damping track (4) acted upon by a friction device (17) which may be a pneumatic device attached to the extremity of the shaft (2); the track (4) may be articulated to a fixed portion of the rear of the truck or flexible enough to absorb lurching and pitching motions. The friction device (13) consists of friction slides (21, 22) pressed against the track(4) by an actuator (27) that may be pneumatic. The intensity of the force it generates varies depending upon the cargo in the trailer and/or vehicle speed in order to automatically adapt the yaw-damping effect. This adaptation is achieved by making the actuator (27) subject to suspension pressure and/or vehicle speed. This invention is of interest to manufacturers of trailers and couplings.

24 Claims, 6 Drawing Sheets

DEVICE FOR DAMPING THE YAWING MOTIONS OF A HIGHWAY TRAILER DRAWN BY A MOTOR VEHICLE

FIELD OF THE INVENTION

The invention concerns a device for damping yaw in a trailer on highway vehicle consisting of a motor vehicle drawing a trailer, said device also constituting a safety feature in the event the coupling breaks.

More specifically, it is designed to improve the traction of a highway vehicle consisting of a motor vehicle pulling a tractor with a central axle, also called a balanced trailer.

BACKGROUND OF THE INVENTION

The risks and dangers associated with yawing trailers during descent at certain speeds are well-known.

These conditions can even cause the trailer to tip or shift sideways, known as being "jackknifed".

A number of devices for limiting yawing motion already exist.

They consist mainly of telescoping lateral arms with damping effects. These arms are attached along the coupling on either side with a ball and socket connection at one extremity on the rear of the vehicle, and are attached to the coupling with a ball and socket connection at the other extremity.

These arms are sufficient to limit small amplitude movements, but large trailers carrying heavy loads remain susceptible to danger.

SUMMARY OF THE INVENTION

The object of the invention is to damp and thus limit yaw amplitude by the trailer in a unit consisting of a motor vehicle drawing a trailer. The means according to the invention also constitutes a safety device which forms a temporary connection if the coupling breaks.

To achieve this objective, the damping mechanism comprises a rigid or flexible curvilinear damping track which is acted upon by a friction device attached at the end of the shaft, with either end of the track extending into an articulated or non-articulated connection joining a fixed portion of the rear of the motor vehicle. The friction device consists of flat friction pieces which are placed in contact with the surfaces of the curvilinear track by a force pushing the structures together. The intensity of the push varies, allowing the degree of damping to be adapted according to need. Adaptation occurs automatically and simply, by associating the pushing force with the trailer's pneumatic suspension and/or to the speed of the vehicle.

In the case of a vehicle without any pneumatic suspension system, either vehicle speed alone is used, or a specialized sensor is used to determine the extent of the trailer's cargo.

A device for limiting yawing motion is already known, consisting of a section of metal disc and a bracket attached to the trailer's shaft, equipped with two friction slides. These slides are firmly pressed on either side by the disc using a flexible force device to form a friction brake against the pivoting motion of the shaft in relation to the vehicle and thereby limiting the yawing motion of the trailer.

When nearly worn out, the damping effect achieved with this system is of predetermined intensity dependent only upon the force exerted by the flexible force upon the friction slides and thereby on the sector of track.

With the damping device according to the invention, the force pressing the friction structures against the curvilinear track is not constant. It varies, making the degree of motion absorbed a function of the weight carried by the trailer and/or its speed. It is known that the heavier the cargo on the trailer, the more likely there will be yawing of the trailer and the greater the danger, since the trailer's inertia increases. The device of the present invention advantageously increases the damping effect in this situation. Actually, the larger the load in the trailer, the greater the pressure exerted on the suspension, and the harder the yawing devices press the friction structures against the curvilinear track, thus increasing friction.

Conversely, when the trailer is empty or carrying a light load, the trailer's inertia decreases. In this case, less damping suffices. The suspension elements are not pressured as much and the device of the invention that depends upon the suspension elements thus decreases the force exerted on the friction devices, thereby decreasing friction and damping intensity. These variations are obtained simply, quickly, and are completely automatic.

It is also known that speed increases yawing motion. Therefore, both speed values and the amount of pressure on the suspension system can be used to form the basis of an improved control system.

It is also possible to limit yawing by using one or the other of these variables. Obviously, if there is a different type of suspension system, pneumatic control is not possible and a specialized sensor needs to be used if the trailer's load is used as a basis for the system.

Adapting the intensity of yaw damping to the weight being hauled and/or to vehicle speed decreases wear on the friction structures and thus prolongs the life of the device.

In the same way, yaw damping intensity can also be varied automatically as a function of road conditions, that-is, the difficulties in terrain which the vehicle encounters and the constraints imposed: acceleration, braking, centrifugal force, etc.

The device of the invention has an additional feature: due to the use of a gripping element, maintenance is greatly facilitated; for example, when replacing friction plates and coupling or uncoupling the trailer. With the prior art yaw reduction system, in order to perform the connecting and disconnecting operations, it was necessary to combat a permanent flexible recall force, such as a spring. With the device of the invention, it is only necessary to release the gripping pressure and these operations can be performed effortlessly.

Furthermore, if a pneumatic device is used to press the friction devices together, the invention automatically compensates for the play caused by wear on the friction structures by adapting the pressure applied to the pneumatic activator.

In the latter instance, the nature of fluid pneumatic energy provides a certain progression or reduction in the application of force due to the pneumatic effect accompanying each action.

BRIEF DESCRIPTION OF THE DRAWINGS

Other characteristics and features of the invention will be apparent from the following description offered by way of non-limiting examples, and with reference to the accompanying drawings wherein.

DETAILED DESCRIPTION OF THE INVENTION

Figure 1:
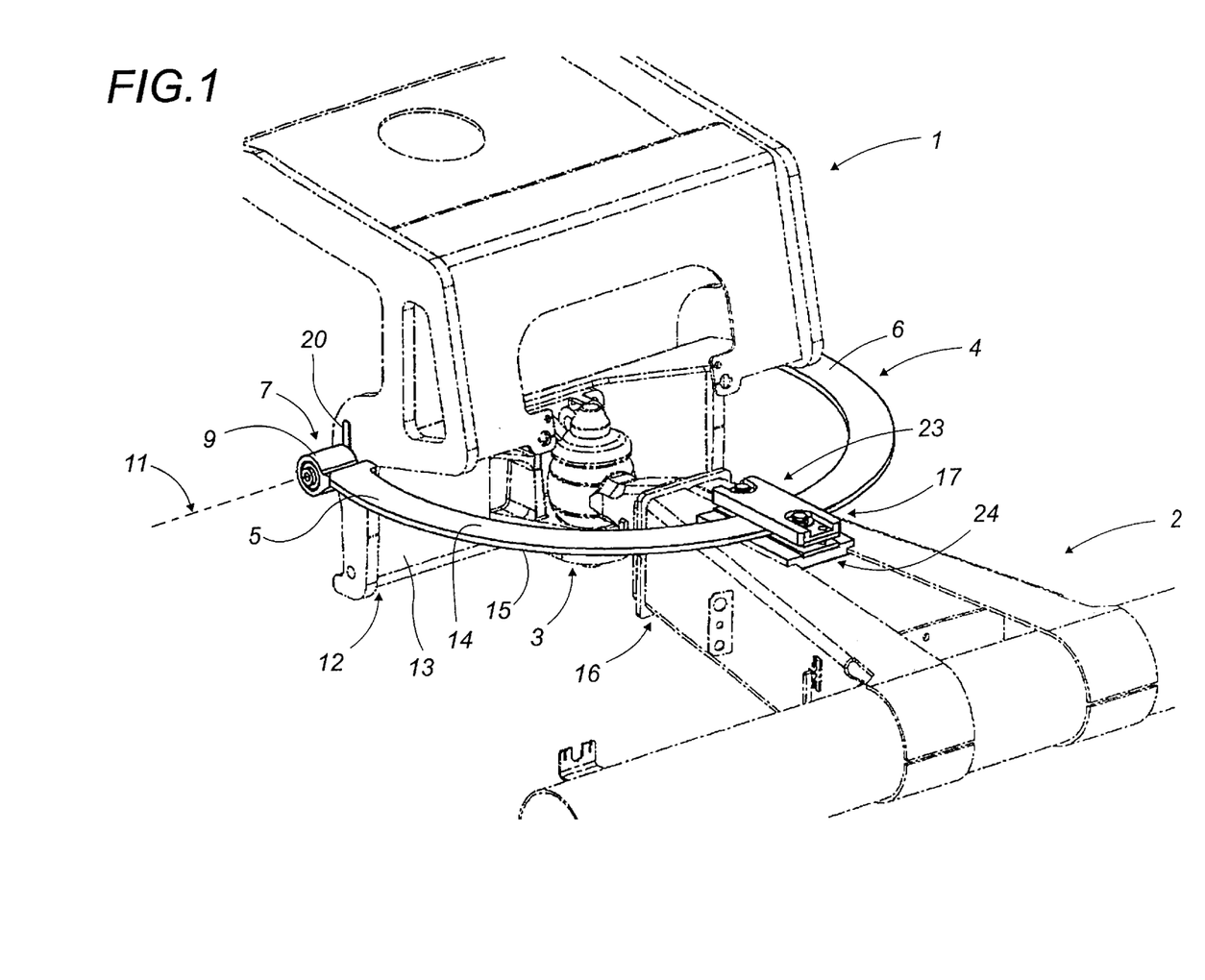
FIG. 1 is general overhead perspective and oblique rear view of the motor vehicle and the trailer coupling equipped with the yaw-damping device according to the invention.
Figure 2:
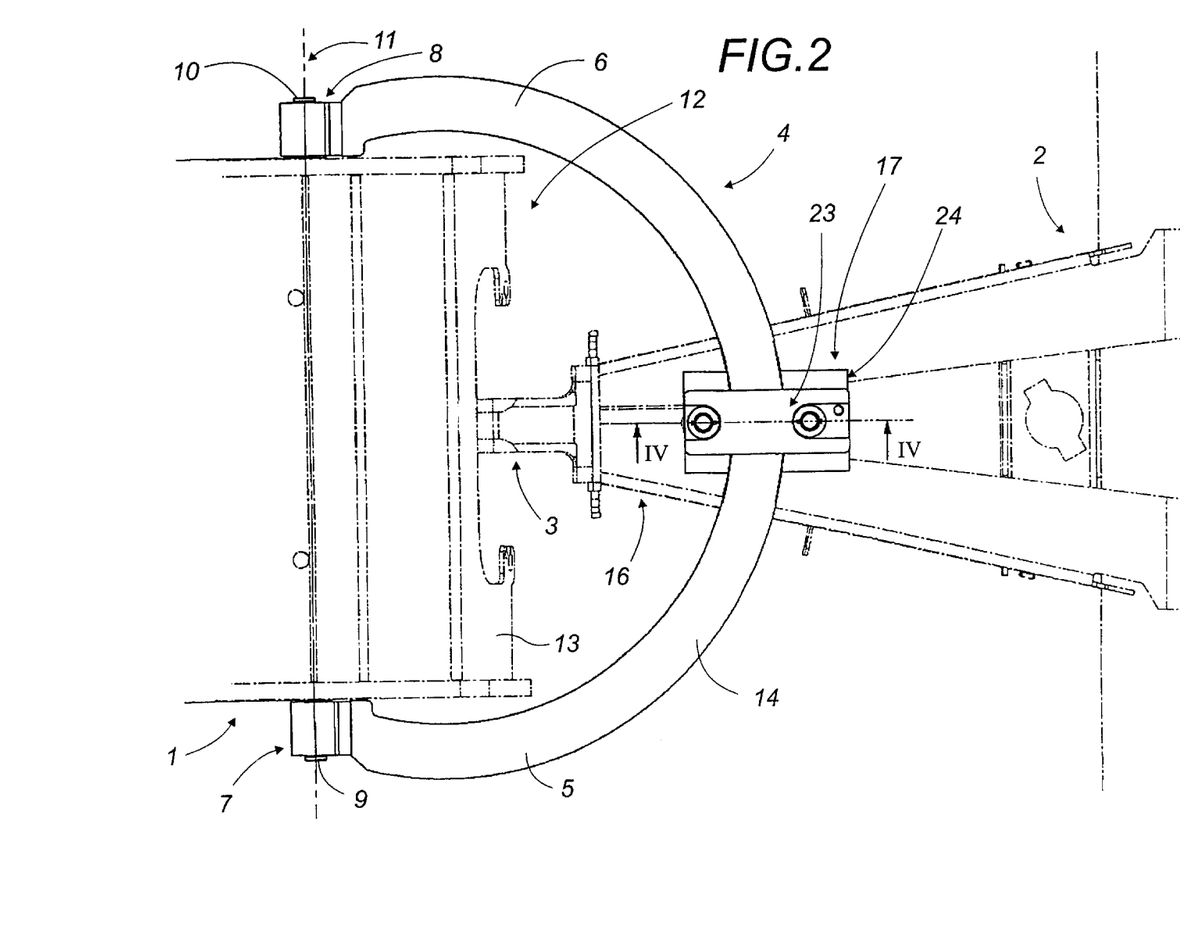
FIG. 2 is a plane view representing the rear of the motor vehicle and the coupling equipped with the yaw-damping device according to the invention.
Figure 3:
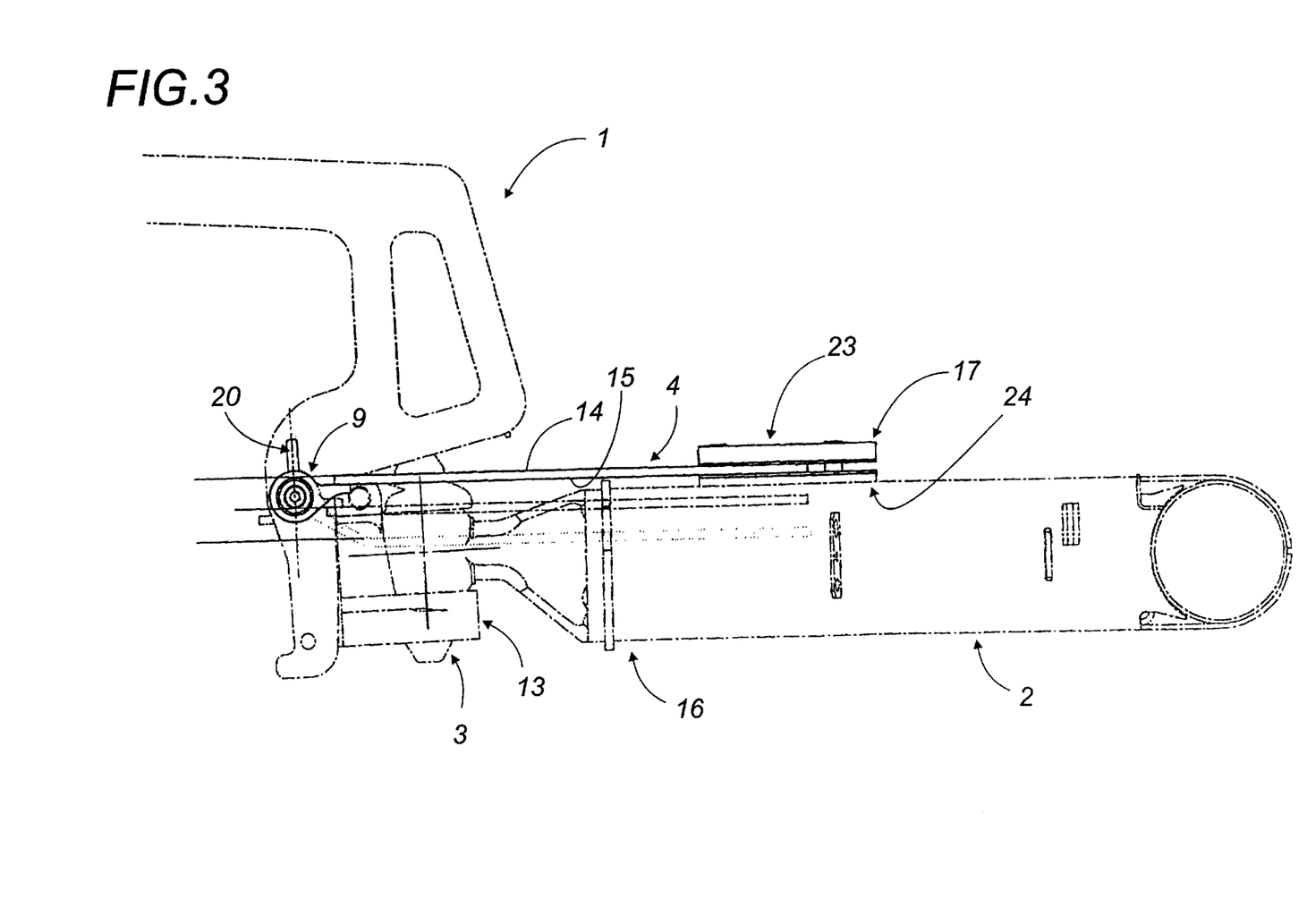
FIG. 3 is a profile view showing the rear of the motor vehicle and the coupling equipped with the yaw-damping device according to the invention.

The device for damping yaw motion is attached to the rear portion 1 of the chassis or carriage of a motor vehicle coupled with a trailer by a shaft 2 articulated to a mechanical assembly known conventionally as a trailer hitch 3. The yaw-damping device is composed of a damping track 4, curvilinear in shape and preferably forming an arc, centered on the trailer hitch 3. Yaw-damping track 4 is a rigid metal plate or a flexible blade, i.e., flexible enough to be deformed and return to its initial position and state after being subjected to pressure. Each extremity of the track extends into connections 5 and 6 joining the rear portion of the chassis, to which the track is attached. According to the embodiment shown, the track support terminates in free extremities 7 and 8 each articulated to a fixed portion by a pivoting articulation 9 or 10 allowing at least one pivoting movement around an axle 11 which is transverse to the longitudinal axle of the motor vehicle.

According to an embodiment with a flexible track, the track extremities are attached to the chassis and deformation by the extremities provides absorbs lurching and pitching motions.

Preferably, in the articulated embodiment, articulations 9 and 10 are ball and socket connections allowing several degrees of freedom when absorbing pitching motion combined with lurching motion, or some appropriate means is used to provide clearance on the pivot axle for pitching motion.

The articulated attachment to the extremities of the support for damping track 4 consists of a constructive block 12 fixed in relation to the motor vehicle chassis possibly, but not necessarily, to a mechanical block 13 to which trailer hitch 3 is attached.

In accordance with the embodiment shown, this damping track 4 is e plate or a blade of varying thickness made of flexible material, for example metal, that is horizontal, i.e., in the plane parallel to the shaft, and the functional portion, at least, of the blade is arc-shaped. It has two flat friction surfaces, an upper surface 14 and a lower surface 15. This damping track extends on either side of shaft 2 and crosses over It, for example, above it near front extremity 16. Upper portion of front extremity 16 of shaft 2 houses a friction device 17, the function of which is to absorb yawing movements when the flat front surfaces 18 and 19 of friction slides 21 and 22 contact the respective surfaces 14 and 15 of damping track 4 when pushed together by one or more forces, for example, pneumatic force(s).

It is possible that the friction surfaces on surfaces 14 and 15 of track 4 could be attached or arranged differently, or that the surfaces of the damping track could be coated with a friction layer.

To ensure. satisfactory performance, that is, to guarantee that the flat surfaces of the friction slides effectively contact the flat surfaces of damping track 4, the plane defined by the track is essentially parallel to the supporting plane to which friction device 17 is attached.

Insofar as the connection between damping track 4 and the chassis is concerned, there may be a slot 20 perpendicular to pivot axle 11, located above each articulation 9 and 10, provided as a safety measure. If there is considerable lurching, for example, on an inclined surface, articulation axles 9 and 10 can slide inside slots 20 and thus each one can position itself at a different level.

Preferably the trailer coupling is located as close as possible to the plane defined by the damping track.

Although pneumatic energy is the preferred means of activating the friction device of the present invention, it should be noted that all types of energy can be used, not only hydraulic energy, but others as well, such as electrical energy.

Figure 4:
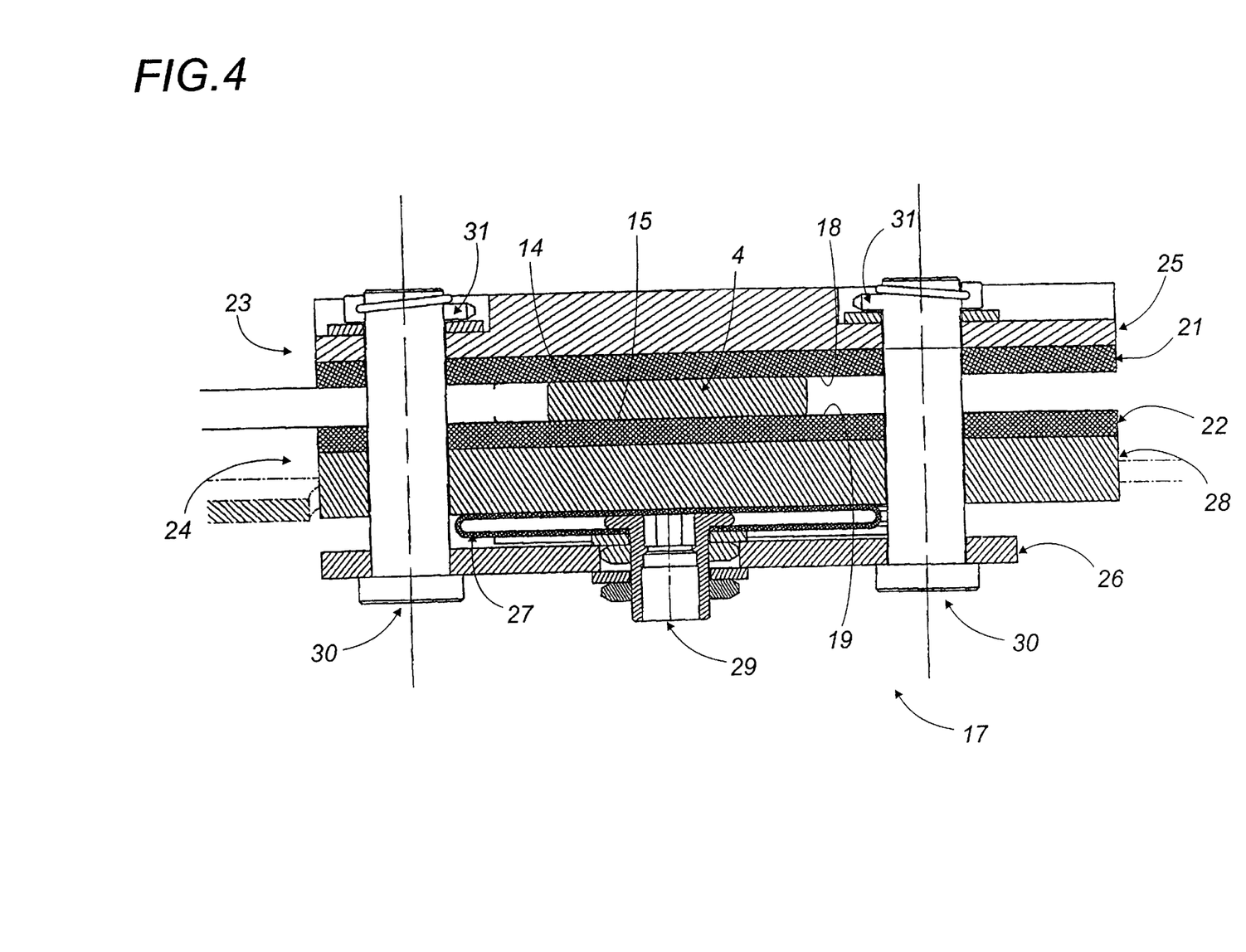
FIG. 4 is a transverse cross-section taken along line IV—IV of FIG. 2 of one embodiment of the yaw-damping device according to the invention.

The following is a detailed description of friction device 17 in the embodiment of the invention shown in FIG. 4. It is a pneumatic friction device.

Friction device 17, housed inside the central portion of shaft 2, comprises a succession of superimposed elements on either side of damping track 4. This friction device has brake shoes 23, 24 supporting upper and lower friction slides 21 and 22, for example, small contact plates.

Upper brake shoe 23 has on its exterior surface a closing plate 25 and on its interior surface, a friction slide 21. Lower brake shoe 24 has more parts. It also has a closing plate 26 on its exterior edge and a friction slide 22 on its interior edge. A pneumatic actuator 27 is located beneath a separating plate 28 abutting lower slide 22.

Under the influence of pressure, pneumatic actuator 27 exerts an upward force against separating plate 28 which is transmitted to. lower slide 22 covering separating plate 28. This force moves lower slide 22 towards surface 15 of damping track 4 and presses it against surface 15 of damping track 4. Damping track 4 is thus gripped by the two friction slides 21 and 22. When yawing occurs, the motion of damping track 4 in relation to the shaft is absorbed by the friction between surfaces 14, 15 of the damping track and surfaces 18, 19 of the friction slides.

Separating plate 28 spreads the force generated by pneumatic actuator 27 over lower slide 22, increasing efficiency and ensuring uniform wear, since the slide is a relatively fragile part.

The pneumatic actuator 27 shown is a pneumatic bellows with a single air chamber, connected to the compressed air supply by an inlet-outlet opening 29. The pressure of the compressed air dilates the chamber, causing an upward push on the lower plate and thus moving the friction surfaces together. Obviously the pneumatic actuator can be different from the one shown without departing from the scope of the invention. For example, it may consist of a bellows of the type used in suspension systems, or some sort of air chamber such as the tube used in fire trucks, or a flexible flat tube. It is also possible to conceive of variations of the invention using another type of pneumatic actuator, for example, a pneumatic cylinder.

According to another variation, pneumatic force is no longer applied to the lower friction surface, but to the upper friction surface, moving it towards damping track 4.

The components of friction device 17 are maintained in position against each other by one or more attachment devices, such connecting rods 30 which block and stop upper closing plate 25 using contact gaskets immobilized on the upper plate by pin blocks 31 with safety rings. When subjected to pneumatic pressure, upper plate 25 butts against the contact washers.

When slides 21 and 22 become thin with wear, they exert less friction on damping track 4. However, because of the pneumatic device of the invention, there is compensation for this wear because pressure does not evolve with wear. In comparison with conventional systems, where it is necessary to mechanically adjust and tighten the attachment means, this function is permanent and automatic.

When the wear on slides 21 and 22 reaches the point that replacement is necessary, maintenance of friction device 17 of the present invention is greatly facilitated in comparison with conventional devices. It is merely necessary to deflate pneumatic actuator 27, eliminating the force moving the various elements together and allowing the friction slides to easily be removed, working from above. In conventional systems, the attachment and removal processes are complicated by the permanent flexible recall force pushing the elements together.

According to an essential characteristic of the invention, pneumatic activator 27 is connected to the pneumatic suspension system of the trailer and/or of the truck, either directly by joining it to the vehicle supply line, or by means of a secondary circuit comprising at least one pressure sensor placed in the suspension system circuit of the trailer and/or truck, and a control module. The pressure of the fluid inside pneumatic actuator 27 may therefore vary depending upon the suspension characteristics resulting from the weight carried by the trailer or truck, or both at once. Thus, yaw damping is permanently, automatically regulated as a specific function of the weight of the truck.

It is important to mention that vehicle speed also forms a basis for the system, used either instead of pressure within the suspension system, or in conjunction with it.

Speed can also be taken into account, proceeding from either the lowest speed or a speed threshold and increasing yaw damping above that threshold.

For this purpose there is a special sensor on the trailer and/or on the truck, or an existing circuit may be used to obtain the truck's speed, such as the speed values furnished by the braking control system known as ABS.

Figure 5:
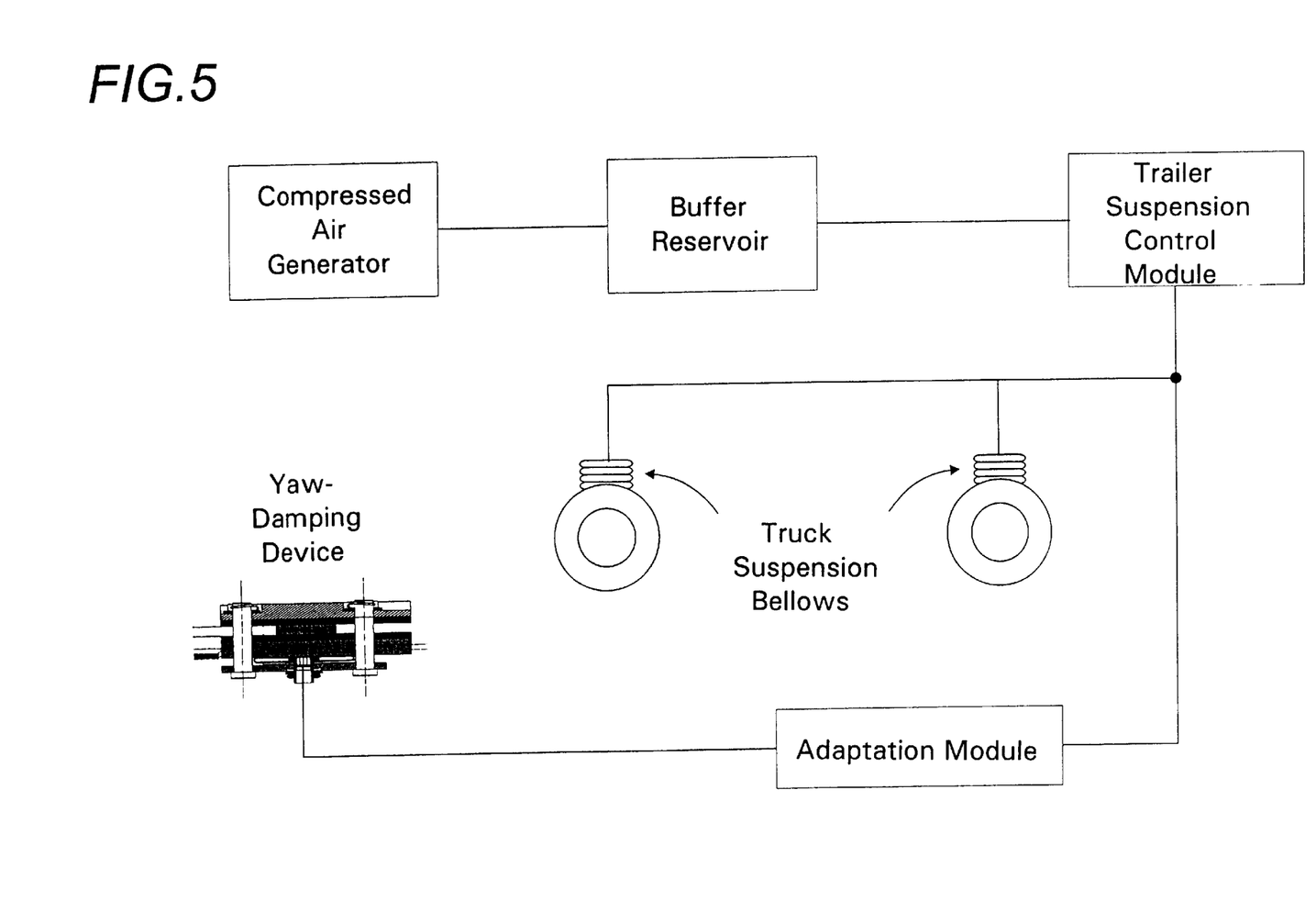
FIG. 5 is a simplified explanatory schema of the pneumatic control circuit for the yaw-damping device showing its direct connection to the pneumatic suspension circuit of the trailer.
Figure 6:
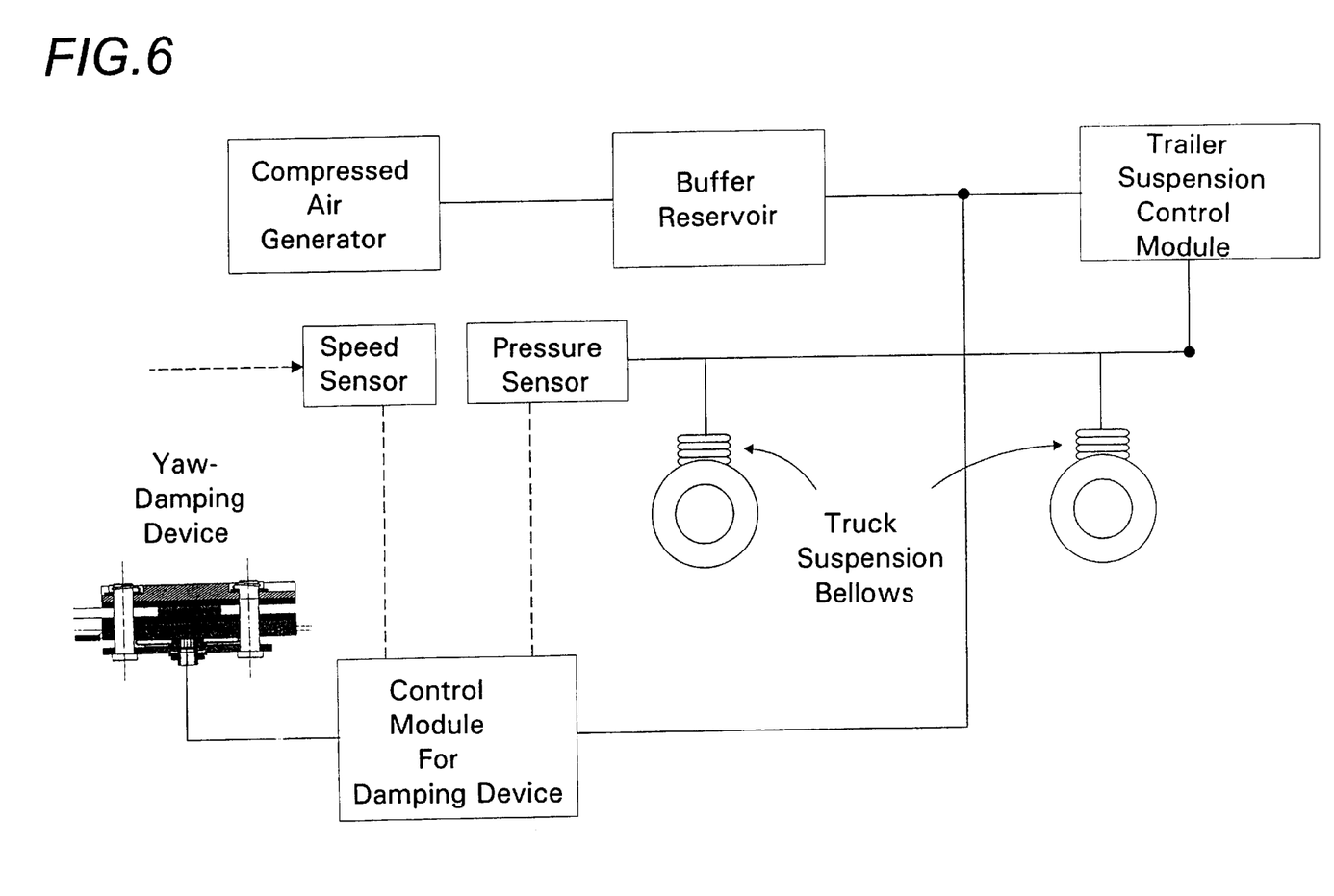
FIG. 6 is an explanatory schema of the pneumatic control circuit for the yaw-damping device showing how it is connected to the pneumatic suspension circuit of the trailer by means of a pressure sensor and a speed detector.

Two exemplary embodiments of the control circuit for the damping device are illustrated schematically in FIGS. 5 and 6.

The trailer's pneumatic suspension systems are supplied with compressed air by a compressor through a buffer reservoir, and then a command and control module.

In FIGS. 5 and 6 suspension is illustrated schematically by the bellows and the modules and sensors, by rectangles.

In the base variation shown in FIG. 5, the compressed air controlling pneumatic actuator 27 is derived by tapping into the conduit supplying the suspension system; the air is then sent to the yaw-damping device through an adaptation module. The compressed air serves as the driving fluid for pneumatic actuator 27, which it enters through opening 29. The resulting degree of damping depends upon instant pneumatic pressure in the conduit supplying the suspension system.

The compressed air may also be taken from the pneumatic circuit of the motor vehicle or the truck.

The design of this base variation constitutes a primary means of making the damping action dependent upon the pressure of the pneumatic suspension systems in the trailer and/or truck, translating the weight carried by that vehicle. Thus, as the weight of the truck and/or the trailer increases, the pressure in pneumatic actuator 27 increases equally, reinforcing gripping and thereby increasing the damping effect.

In this embodiment it is preferable for there to be equal pressure on the suspension systems of the trailer and pneumatic actuator 27.

According to the second variation shown, motion absorption is achieved using an actual control loop as shown in the example illustrated in FIG. 6.

In this arrangement the supply of pressurized pneumatic fluid to the damping device originates directly from the compressed air source by tapping into it before the buffer reservoir. The principal line of compressed air supplies the damping device through a control module which operates on the basis of the values or the condition of a pressure sensor mounted on the compressed air supply line of the trailer and/or the truck. The pressure sensor is a transducer or other pressure-sensitive device from which or through the use of which a control module can direct the pneumatic energy reaching the damping device. Thus, this damping device is controlled on the basis of the work and the state of the suspension system in the trailer and/or in the truck.

According to another interesting variation, a vehicle speed sensor is added to the pressure sensor so that the rate of speed forms the basis for the law of gripping force applied to the friction plates.

According to another variation, the damping device may be controlled only on the basis of the speed sensor.

There may be other elements on the pneumatic circuit which are not shown, for example, a device which calculates the average pressure in the two suspension bellows for the purpose of determining the pressure of the gripping fluid to be sent through the damping device. In practice, pressure may differ in the two suspension systems, especially on an incline.

It is conceivable for an embodiment of the device of the invention to have a pneumatic actuator 27 supplied with gripping fluid by a source independent of the suspension system circuit, but where the fluid pressure would be calculated on the basis of parameters relating to this circuit.

It is also conceivable that a different type of energy or a fluid other than compressed air could be used to drivel the gripping elements, for example, hydraulic fluid or electrical energy.

Numerous other variations are possible. For example, a supplemental fluid pressure control device could be introduced, either controlled by the operator or dependent upon certain specific characteristics derived from motion parameters, especially the amplitude of yawing motions or speed values.

The law of gripping force could be such that the intensity of the force applied would be inversely proportionate to the angular separation between the direction of alignment of the vehicle's longitudinal axle and that of the trailer's longitudinal axle.

Naturally, in this case, it would be preferable not to activate the force on turns in order to leave the shaft completely free to move.

For this purpose it would be possible to have a damping track 4 which varies in thickness, for example, with a larger central portion that decreases in size toward the extremities. The opposite design could also be used, i.e., with a more narrow center.

There are various design and technological possibilities for constructing yaw-damping track 4, friction device 17, and attachment of the system near the front extremity 16 of shaft 2.

In particular, it is possible to have a mechanical unit operating in the form of a single constructive block on which the following elements are located near front extremity 16 of shaft 2: damping track 4 and its extensions 5 and 6, each terminating in an articulated connection 9 and 10, or a direct connection, and friction device 17, attached or to be attached to front extremity 16 of shaft 2.

According to an additional variation, articulated connections 9 and 10 are joined to each other by a connecting cross-piece (not shown) that supports the attachment means, which may be removable, on a fixed portion of the rear of the motor vehicle.

Thus, since there is a means for detaching this cross-piece from the chassis of the motor vehicle or from a plate integral with the chassis, it is possible to mount, attach, or join—either by placing it in contact or otherwise connecting it—the device of the invention, previously attached to the front extremity of the shaft, to the rear of a motor vehicle each time the trailer is coupled with it, and simultaneously with that operation.

Insofar as the arc-shaped blade which partially constitutes damping track 4 is concerned, it preferably has the following characteristics.

The radius of the arc is as large as is technically possible to have the least possible amount of friction on a single damping coupling. Exposure to less friction decreases wear on the friction surfaces, reducing maintenance expense and extending the life of the friction device. Esthetic considerations and the position of the friction device on the shaft are also factors to consider in selecting the radius.

Preferably, the blade is relatively thin in order to be flexible and easily deformed, for example, by twisting.

Additionally, there must be radial clearance for the blade; that is, the blade must be longitudinally displaceable in relation to shaft 2 when the slope of the road changes, and move away from it or closer to it as the road ascends or descends.

This may require an increase in the longitudinal size of the brake shoes on friction device 17.

A mechanism such as the pneumatic damping device of the invention provides a system of supplemental safety features if the connection should break at the trailer coupling.

If the mechanical connection should actually break at the trailer coupling, curvilinear damping track 4, with its pivoting support attached to the rear of the motor vehicle, forms a temporary mechanical connection between the motor vehicle and the trailer.

What is claimed is:

1. A device for damping yaw of a trailer drawn by a truck, at least one of the trailer and truck having a pneumatic suspension system, the device comprising:
    a curvilinear damping track (4) centered about a coupling (3) connecting the truck and trailer, but separate from the coupling (3); the curvilinear damping track (4) being connected to one of a damping track support integral with a rear of the truck and to an intermediate support to be attached to a fixed portion of the rear of the truck so as to absorb lurching and pitching;
    a friction brake (17) affixed with a trailer hitch shaft (2) having friction elements (21, 22) which are forced against surfaces of the damping track (4) by an actuator (27) which dampens the yaw by squeezing the friction elements against the surfaces of the damping track (4); and
    wherein the actuator (27) squeezing the friction elements against the damping track (4) to provide yaw damping is controlled based on one of a cargo weight and a speed of one of the trailer and the truck wherein a change in at least one of the cargo weight and the speed of one of the trailer and the truck produces a corresponding change in the yaw damping and the actuator (27) is driven by a suspension system fluid.

2. The damping device according to claim 1, wherein the suspension system fluid drives the actuator (27) by directly connecting a conduit to the suspension system.

3. The damping device according to claim 1, wherein operation of the actuator (27) is governed by a control loop dependent upon a suspension system pressure measured in the suspension system.

4. The damping device according to claim 1, wherein operation of the actuator (27) is governed by a control loop dependent upon the cargo weight on the trailer.

5. The damping device according to claim 1, wherein operation of the actuator (27) is governed by a control loop dependent upon a suspension system pressure and the speed of one of the trailer and the truck.

6. The damping device according to claim 1, wherein operation of the actuator (27) is governed by a control loop dependent upon the speed of one of the truck and trailer.

7. The damping device according to claim 5, wherein the speed of one of the truck and the trailer is used as the basis for yaw damping only where the speed exceeds a desired threshold.

8. The damping device according to claim 3, wherein the actuator (27) is governed by a device sensing the prevailing suspension system pressure in a conduit supplying suspension fluid to one of the truck and trailer.

9. The damping device according to claim 5, wherein the actuator (27) is controlled by an element that is sensitive to the speed of one of the truck and trailer.

10. The damping device according to claim 1, wherein the curvilinear damping track (4) is a blade made of flexible material having a first and second extremities attached to the rear of the truck.

11. The damping device according to claim 1, wherein the friction device (17) is attached to an upper surface of a front extremity (16) of the trailer hitch shaft (2).

12. The damping device according to claim 1, wherein the curvilinear damping track (4) has a friction coating.

13. The damping device according to claim 1, wherein the damping track (4) comprises two parallel opposing surfaces (14) and (15) aligned essentially parallel to a plane defined by one of the trailer hitch shaft (2) and the road, and the friction device (17) is a gripping device for gripping the two parallel opposing surfaces.

14. The damping device according to claim 1, wherein the friction device (17) comprises brake shoes (23) and (24) having plates (21, 22) which are pushed together by the actuator (27) until they contact and grip the opposing surfaces (14 and 15) of the damping track (4).

15. The damping device according to claim 1, wherein a thickness of the damping track (4) varies near a first and second extremities of the damping track.

16. The damping device according to claim 1, wherein the actuator (27) is driven by pneumatic energy.

17. The damping device according to claim 1, wherein the actuator (27) comprises an air chamber.

18. The damping device according to claim 1, wherein the actuator (27) comprises a bellows having one or more loops.

19. The damping device according to claim 18, wherein the bellows is a pneumatic suspension bellows of the suspension system.

20. The damping device according to claim 16, wherein the actuator (27) comprises a pneumatic cylinder.

21. The damping device according to claim 1, wherein the friction elements of the friction device (17) sandwich the damping track (4) therebetween and wherein the friction elements of the friction device are held together by one or more attachment devices which facilitate detachment of the friction elements from the darning track (4) after a necessary force provided by the actuator (27) in squeezing friction elements together has been nullified or diminished.

22. The damping device according to claim 1, wherein the damping device is a single unit mounted on a front extremity of the trailer hitch shaft (2), the single unit comprising the damping track (4), the friction device (17) affixed to the trailer hitch shaft (2), and a mechanical interface joining a first and second extremities of the damping track (4) about which the first and second extremities of the damping track (4) are articulated.

23. A device for damping yaw of a trailer drawn by a truck, at least one of the trailer and truck having a pneumatic suspension system, the device comprising:

a curvilinear damping track (4) centered about a coupling (3) connecting the truck and trailer, but separate from the coupling (3); the curvilinear damping track (4) being connected to one of a damping track support integral with a rear of the truck and to an intermediate support to be attached to a fixed portion of the rear of the truck so as to absorb lurching and pitching;

a friction brake (17) affixed with a trailer hitch shaft (2) having friction elements (21, 22) which are forced against surfaces of the damping track (4) by an actuator (27) which dampens the yaw by squeezing the friction elements against the surfaces of the damping track (4);

the actuator (27) squeezing the friction elements against the damping track (4) to provide yaw damping is controlled based on one of a cargo weight and a speed of one of the trailer and the truck wherein a change in at least one of the cargo weight and the speed of one of the trailer and the truck produces a corresponding change in the yaw damping and the actuator (27) is driven by a suspension system fluid; and wherein the friction device (17) is attached to an upper surface of a front extremity (16) of the trailer hitch shaft (2).

24. A device for damping yaw of a trailer drawn by a truck, at least one of the trailer and truck having a pneumatic suspension system, the device comprising:

a curvilinear damping track (4) centered about a coupling (3) connecting the truck and trailer, but separate from the coupling (3); the curvilinear damping track (4) being connected to one of a damping track support integral with a rear of the truck and to an intermediate support to be attached to a fixed portion of the rear of the truck so as to absorb lurching and pitching;

a friction brake (17) affixed with a trailer hitch shaft (2) having friction elements (21, 22) which are forced against surfaces of the damping track (4) by an actuator (27) which dampens the yaw by squeezing the friction elements against the surfaces of the damping track (4);

the actuator (27) squeezing the friction elements against the damping track (4) to provide yaw damping is controlled based on one of a cargo weight and a speed of one of the trailer and the truck wherein a change in at least one of the cargo weight and the speed of one of the trailer and the truck produces a corresponding change in the yaw damping and the actuator (27) is driven by a suspension system fluid; and wherein a thickness of the damping track (4) varies near a first and second extremities of the damping track.

* * * * *